United States Patent [19]

Bishop

[11] 3,770,478

[45] Nov. 6, 1973

[54] TRANSFER MEDIUM WITH A PIGMENTED COATING

[75] Inventor: John J. Bishop, Dayton, Ohio

[73] Assignee: The National Cash Register Company, Dayton, Ohio

[22] Filed: Aug. 31, 1971

[21] Appl. No.: 176,737

[52] U.S. Cl.. 117/3.4, 117/138.8 F, 117/138.8 UA, 260/39 P
[51] Int. Cl.......................... B41m 3/12, B32b 27/08
[58] Field of Search.................. 117/3.4, 138.8 UA, 117/138.8 F; 260/39 P

[56] References Cited
UNITED STATES PATENTS

| | | | |
|---|---|---|---|
| 3,639,166 | 2/1972 | Fellows et al. | 117/138.8 |
| 3,663,278 | 5/1972 | Blose et al. | 117/138.8 |
| 3,060,023 | 10/1962 | Burg et al. | 117/3.4 X |
| 3,067,054 | 12/1962 | Reese | 117/3.4 |

Primary Examiner—William D. Martin
Assistant Examiner—Sadie L. Childs
Attorney—E. Frank McKinney et al.

[57] ABSTRACT

Pigmented coatings comprised of $TiO_2$ pigment in a binder of aminotriazine resin and polyester or a copolymer are disclosed. The coatings can be placed on a transfer base such as polyethylene terephthalate and transferred to credit card basis. Organic solvent based coatings also can be silk-screened directly onto the credit cards. Up to 50 weight percent of the $TiO_2$ pigment can be replaced with a pigment extender such as $CaCO_3$. The resulting credit cards are resistant to scratching and other surface damage. By the use of a dual binder system, the pigmented coating is easily transferred in one step and permanently heat sealed in a second step.

5 Claims, No Drawings

TRANSFER MEDIUM WITH A PIGMENTED COATING

This invention relates to pigmented coatings, transfer media, credit cards and processes for transferring and fusing the pigmented coatings to the credit cards.

Scratch resistant coatings and transfer media thereof are known in the art, see United States Patent Application Ser. No. 35,230 filed on May 6, 1970 and now U.S. Pat. No. 3,639,166. This application discloses a coating of an olefinic polymer, a wax, an aminotriazine-sulfonamide-formaldehyde resin and a sensible material.

Aminotriazine-sulfonamide-formaldehyde resin hereinafter will be referred to as aminotriazine resin.

Pigmented coatings of $TiO_2$ alone or in combination with a pigment extender now have been found. The binder for the pigmented coatings is aminotriazine resin in combination with polyester, ethylenevinyl acetate copolymer or vinyl maleate copolymer. Transfer media are formed by coating a dispersion of $TiO_2$, pigment extender if employed, and binder on a transfer sheet such as polyethylene terephthalate and allowing the solvent to evaporate. The pigmented coating then can be transferred by heat and/or pressure to a credit card base. In another embodiment, the organic solvent based coatings are silk-screened directly onto the cards by conventional silk-screening procedures. By the use of a dual binder system, the pigmented coating easily is transferred in one step and permanently heat sealed in a second step. If desired, printing, encoding and the like can be carried out on the coating between the two steps.

Accordingly, an object of this invention is to provide pigmented coatings.

Another object of this invention is to provide transfer media.

Still another object of this invention is to provide credit cards with pigmented coatings thereon.

An additional object of this invention is to provide a process for transferring and fusing the pigmented coatings to the credit cards.

Other objects, aspects and advantages of this invention will be apparent to one skilled in the art from the following specification and appended claims.

The pigmented coatings of this invention comprise, on a wet basis, aminotriazine resin, polyester, ethylene-vinyl acetate copolymer or vinyl chloride-maleate copolymer, $TiO_2$ pigment, and solvent. In a preferred embodiment, a pigment extender also is present in the coatings. On a dry basis, the pigmented coatings comprise aminotriazine resin, polyester or copolymer, $TiO_2$ pigment and, if employed, pigment extender.

On a dry basis, the pigmented coatings comprise 5 to 45 weight percent of polyester or copolymer, 10 to 45 weight percent of aminotriazine resin and 10 to 85 weight percent $TiO_2$ pigment. Preferably, the pigmented coatings comprise 5 to 20 weight percent of polyester or copolymer and 10 to 25 weight percent of aminotriazine resin. The wet solution generally contains 40 to 70 weight percent solvent, preferably 45 to 55 weight percent. In a preferred embodiment, up to 50 percent by weight of the $TiO_2$ pigment can be replaced with a pigment extender.

The pigmented coating can be prepared by any means known to the art which assures a uniform mixture of the resin, polyester or copolymer, pigment, solvent and, if employed, the extender. The wet pigmented coating can be applied to the transfer base by roll coating, knife coating or any other means known to the art. The solvent can be evaporated at ambient temperature or can be evaporated by the application of gentle heat.

The $TiO_2$ pigment employed in this invention can be any such pigment. One commercially available $TiO_2$ pigment is Ti-Pure, R-900 (trademark) from E.I. du Pont de Nemours & Co., Wilmington, Del., United States of America. These pigments generally are prepared as finely divided particles by various methods known in the art. The particle size distribution can range up to 10 microns. A preferred particle size distribution ranges up to 5 microns.

The term polyester as used herein includes those polyester resins containing condensates of a polyhydric alcohol, e.g., a $C_2$ to $C_{10}$ saturated or unsaturated polyhydroxy organic alcohol with a polybasic organic acid having 2 to 16 carbon atoms. Examples of these polyester condensates are: poly(ethylene succinate); poly(ethylene sebacate); poly(propylene fumarate); poly(ethylene terephthalate); and the like.

The ethylene-vinyl acetate copolymer latex employed in this invention contains from 40 to 85 weight percent ethylene and 15 to 60 weight percent vinyl acetate.

The aminotriazine resins that can be employed in this invention are described in the previously mentioned United States Patent Application Ser. No. 35,230 at page 9, line 17 to page 15, line 17, the disclosure of the resin being incorporated herein by reference.

The solvent employed in this invention generally is an aromatic hydrocarbon solvent such as benzene, xylene or toluene. Another solvent that is employed is water. The ethylene-vinyl acetate copolymer is more easily handled in a water solvent, while the maleate copolymer and polyester are more easily handled in an aromatic hydrocarbon solvent.

The transfer base to which the pigmented coating is applied is a thin, flexible carrier substrate such as a film, web, sheet, ribbon or the like. The preferred base is a film of polyethylene terephthalate. Other transfer bases are cellophane, polypropylene or the like. The transfer base generally has a thickness of 0.2 to 2 mils, preferably 0.5 to 1 mil.

The credit card base is a sheet of polyvinyl chloride or polyvinyl chloride-polyvinyl acetate copolymer. Generally, the sheet will have the dimensions of a typical credit card, i.e., 3-⅜ inches × 2 inches × 1/32 inch.

After the wet coating has been applied to the transfer base and the solvent has evaporated, the resulting transfer media then is placed over the credit card sheet with the pigmented coating in contact with the credit card. The transfer media is subjected to a pressure ranging from 175 to 475 psi and a temperature ranging from 250° to 300°F. for a time ranging up to 8 seconds. Preferably, the pressure ranges from 280 to 475 psi and the time ranges up to 3 seconds. The transfer base, after cooling, is picked or peeled off of the credit card leaving the credit card with the pigmented coating adhered thereto. Generally, the pigmented coating is in the form of a ¼-inch stripe across the card in a horizontal or vertical direction. If desired, printing, encoding and the like now can be carried out prior to the second heat sealing step. The second heat sealing step is carried out at the following applied conditions: a pressure ranging from 15 to 350 psi, a temperature ranging from 250° to 1,400° F. and a time ranging from 0.05 to 5 seconds. On large scale production runs, the pressure is atmospheric, the temperature ranges from 1,200° to 1,300° F. and the time is 0.1 second. The resulting credit card possesses a minimum of distortion, provides a smooth coating and is tack free at room temperature. By the use of a dual binder system, the pigmented coating is permanently heat sealed along with any encoding in the second heat treatment step. The use of aminotriazine resin in combination with the initial binder imparts permanency to the credit cards of this invention.

The pigmented coating can contain small amounts of additives to accomplish a particular desired effect. For example, small amounts, e.g., a few drops, of wetting agents, anti-settling agents, dispersing agents, antifoamers, or the like or mixtures thereof can be added.

The described coating system is able to provide extremely durable coatings or panels without protective overlays after printing.

The advantages of this invention are further illustrated by the following examples. The materials, proportions and other specific conditions are presented as being typical and should not be construed to limit the invention unduly.

EXAMPLE I

A uniform mixture was prepared to the following specification:

|  | Weight Percent, Wet Dispersion |
|---|---|
| polyester — Goodyear Vitel PE-207 | 4.2 |
| Nuodex Nuosperse 657 | 0.6 |
| melamine-sulfonamide-formaldehyde terpolymer | 5.2 |
| TiO$_2$ pigment | 22.1 |
| BaSO$_4$ pigment extender | 22.1 |
| xylene | 45.7 |

The resulting solution was coated onto a film of polyethylene terephthalate by conventional means. After drying, the pigmented coating contained 7.8 weight percent polyester, 9.6 weight percent terpolymer, 41 weight percent pigment and 40.9 weight percent extender and 0.9 weight percent additive. The resulting transfer media was placed over a polyvinyl chloride credit card base with the pigmented coating in contact with the credit card. The transfer media was subjected to a pressure of 450 psi and a temperature of 250°F. for a time of 3 seconds. After cooling, the polyethylene terephthalate transfer base was peeled away from the credit card. After encoding, the coated credit card was subjected to a pressure of 140 psi and a temperature of 420° F. for a time of 0.2 second. A durable panel on the credit card base is thus provided without protective overlays. The product is resistant to surface damage and provides excellent bonding between the coating, printing and credit card base.

EXAMPLE II

A second credit card was prepared according to Example I except that the coated film was subjected to a temperature of 250° F. and a pressure of 285 psi for a time of 2 seconds and the wet solution and pigmented coating had the following specification:

|  | Weight Percent, Wet Solution |
|---|---|
| Surbynol PC | a few drops |
| ethylene-vinyl acetate copolymer latex | 6.0 |
| melamine-sulfonamide-formaldehyde terpolymer | 7.4 |
| TiO$_2$ pigment | 10.8 |
| CaCO$_3$ pigment extender | 10.8 |
| Water | 60.0 |
| Na$_4$P$_2$O$_7$·10H$_2$O | 0.3 |

After drying, the pigmented coating contained 17 weight percent latex, 21 weight percent terpolymer, 30.6 weight percent pigment and 30.6 weight percent extender and 0.8 weight percent dispersant. This product also was highly resistant to scratching. By use of a dual binder system, the pigmented coating is easily transferred in one step and permanently heat sealed in a second step.

EXAMPLE III

A dispersion of the following materials was prepared:

|  | Weight Percent Wet | Dry |
|---|---|---|
| polyester — Goodyear Vitel PE-207 | 9.0 | 20.1 |
| melamine-sulfonamide-formaldehyde resin | 11.2 | 25.0 |
| TiO$_2$ pigment | 4.5 | 10.0 |
| CaCO$_3$ pigment extender | 20.2 | 44.9 |
| xylene | 55.1 | — |

This was screen coated directly on credit cards using a screen process. It was encoded and heat sealed. This coating gave good adhesion and durability to the card both before and after heat fusing.

EXAMPLE IV

The following materials were made into an adequate dispersion:

|  | Weight Percent Wet | Dry |
|---|---|---|
| vinyl chloride-maleate copolymer (Exon 471) | 5.6 | 18.9 |
| melamine-sulfonamide-formaldehyde resin | 7.5 | 25.4 |
| TiO$_2$ pigment | 3.0 | 10.1 |
| CaCO$_3$ pigment extender | 13.5 | 45.6 |
| toluene | 70.4 | — |

The dispersion was coated on polyethylene terephthalate and hot stamped on credit cards under 250° F., 285 psi for 1 second dwell time. The coating was encoded and heat sealed under 140 psi for 0.2 seconds at 410° F. A durable system was obtained.

Although this invention has been described in considerable detail, it must be understood that such detail is for the purpose of illustration only and that many variations and modifications can be made by one skilled in the art without departing from the scope and spirit thereof.

What is claimed is:

1. A transfer medium consisting essentially of a flexible carrier substrate having adhered to one surface thereof a pigmented coating consisting essentially of a dry mixture of pigment in a dual binder system of ethylene vinyl acetate copolymer or vinyl chloride-maleate copolymer or polyester selected from the group consisting of poly(ethylene succinate), poly(ethylene sebacate), poly(propylene fumarate), and poly(ethylene terephthalate) as an initial binder material and a heat sealing aminotriazine resin as a second binder material wherein the mixture contains 5 to 45 weight percent of the initial binder, 10 to 45 weight percent of the second binder, and 10 to 85 weight percent of the pigment.

2. A transfer medium according to claim 1 wherein the flexible carrier substrate is polyethylene terephthalate.

3. A transfer medium according to claim 1 wherein the pigment is $TiO_2$.

4. A transfer medium according to claim 1 wherein up to 50 weight percent of the pigment is replaced with a pigment extender of $CaCO_3$, $BaSO_4$, $CaSO_4$ or a mixture thereof.

5. A transfer medium according to claim 1 wherein the aminotriazine resin is melamine-sulfonamide-formaldehyde terpolymer.

* * * * *